(12) United States Patent
Mimatsu

(10) Patent No.: US 7,272,727 B2
(45) Date of Patent: Sep. 18, 2007

(54) METHOD FOR MANAGING EXTERNAL STORAGE DEVICES

(75) Inventor: Yasuyuki Mimatsu, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 93 days.

(21) Appl. No.: 11/107,759

(22) Filed: Apr. 18, 2005

(65) Prior Publication Data

US 2006/0236129 A1 Oct. 19, 2006

(51) Int. Cl.
| | |
|---|---|
| *G06F 11/30* | (2006.01) |
| *G06F 12/14* | (2006.01) |
| *H04L 9/32* | (2006.01) |
| *H04L 9/00* | (2006.01) |
| G06F 7/04 | (2006.01) |
| G06F 7/58 | (2006.01) |
| G06F 15/16 | (2006.01) |
| G06F 17/30 | (2006.01) |
| G06K 9/00 | (2006.01) |

(52) U.S. Cl. ............ 713/193; 713/165; 713/189; 380/278; 726/3; 726/4; 726/5; 726/6; 726/7; 726/18; 726/19; 709/227

(58) Field of Classification Search ............ 713/193, 713/189, 165; 380/278; 726/3–7, 18, 19; 709/227

See application file for complete search history.

(56) References Cited

U.S. PATENT DOCUMENTS

| | | | |
|---|---|---|---|
| 5,495,533 A | 2/1996 | Linehan et al. | |
| 5,940,507 A | 8/1999 | Cane et al. | |
| 6,405,315 B1 | 6/2002 | Burns et al. | |
| 6,529,976 B1 | 3/2003 | Fukuzawa et al. | |
| 7,159,240 B2 * | 1/2007 | England et al. | 726/6 |
| 2001/0055395 A1 * | 12/2001 | Vogler | 380/273 |
| 2001/0056533 A1 * | 12/2001 | Yianilos et al. | 713/153 |
| 2003/0088658 A1 * | 5/2003 | Davies et al. | 709/223 |
| 2005/0013441 A1 * | 1/2005 | Klein | 380/278 |
| 2005/0138404 A1 | 6/2005 | Weik et al. | |
| 2005/0144468 A1 * | 6/2005 | Northcutt et al. | 713/189 |
| 2006/0021056 A1 * | 1/2006 | Koppen | 726/26 |

FOREIGN PATENT DOCUMENTS

WO 02/093314 11/2002

OTHER PUBLICATIONS

"Draft Proposal for Key Backup Format for Wide-block Encryption", IEEE 1619, Sep. 24, 2004, pp. 1-9.

* cited by examiner

*Primary Examiner*—Ayaz Sheikh
*Assistant Examiner*—Shin-Hon Chen
(74) *Attorney, Agent, or Firm*—Mattingly, Stanger, Malur & Brundidge, P.C.

(57) ABSTRACT

An apparatus, system, and method enable a new platform storage system to have access to an external storage system having data encrypted thereon by an existing platform storage system. Encryption information corresponding to the encrypted data in the external storage system is stored in a memory in the existing platform storage system. The encryption information stored in the memory of the existing platform storage system is transferred to an encryption table stored in the new platform storage system, so that the new platform storage system can read the encrypted data stored in the external storage system.

40 Claims, 11 Drawing Sheets

11009
12009

| Vol. # (20001) | WWN (20002) | LUN (20003) |
|---|---|---|
| 1 | Port1 | Lun1 |
| 2 | Port2 | Lun2 |
| ... | | |

| Vol. # (30001) | Algorithm (30002) | Key length (30003) | Key (30004) |
|---|---|---|---|
| 1 | AES256 | 256 | key1 |
| 2 | N/A | | |
| ... | | | |

| WWN | LUN | Algorithm | Key length | Key |
|---|---|---|---|---|
| Port1 | Lun1 | AES256 | 256 | key1 |
| ... | | | | |

| Vol. ID | Start LBA | Last LBA | Algorithm | Key length | Key |
|---|---|---|---|---|---|
| StorageX-Vol.M | 0 | 1023 | AES256 | 256 | key1 |
| StorageY-Vol.N | 1024 | 2047 | TRIPLEDES | 56 | key2 |
| ... | | | | | |

METHOD FOR MANAGING EXTERNAL STORAGE DEVICES

BACKGROUND OF THE INVENTION

1. Field of the Invention

This invention is related to a method of managing external storage devices. In particular, the present invention is directed to a method of enabling access to encrypted data in external storage devices from one platform storage system to another platform storage system.

2. Description of the Related Art

Recent computer storage systems have a function called "external connection" which connects one storage system to other storage systems. The storage system discovers disk volumes in the external storage systems and exports them to host computers via its communication ports as if they are internal disk volumes in the storage system. If the storage system has advanced functions, for example, volume mirroring, a large capacity of cache memory, various types of host-connectivity, etc., it can provide these functions to external storage systems which do not have such functions. An example of a storage system having external storage systems is disclosed in U.S. Pat. No. 6,529,976 to Fukuzawa et al. (entitled "Heterogeneous computer system, heterogeneous input output system and data back-up method for the systems"), the disclosure of which is hereby incorporated by reference. This patent discloses a storage system which has external connection functions and is called a "platform storage system". Disk volumes in the platform storage system and external storage system are called "internal volumes" and "external volumes", respectively.

In recent years, storage security has become an important concern for large enterprises and governmental organizations. Encryption is a common way to prevent illegal access to confidential data. Data written by host computers is encrypted by a storage controller before being stored in disk drives so that the data cannot be read by unauthorized users even if the disk drives are stolen. A storage appliance with such kind of encryption is disclosed in international publication WO 2002093314 to Avida et al. (entitled "Encryption Based Security System for Network Storage"), the disclosure of which is hereby incorporated by reference. Some organizations are developing standards for storage security. For example, IEEE p 1619 (Draft Proposal for Key Backup Format for Wide-block Encryption 1.04:00", http://siswg.org/docs/KeyBackup-10-04-2004.pdf) defines standards for cryptographic algorithms and methods for encrypting data before the data is sent to storage devices.

When a platform storage system encrypts data to be stored in one or more external storage systems, the data can be read only if it is accessed via the platform storage system. However, that means if the existing platform storage system is replaced by a new platform storage system to update computer systems, the data cannot be accessed in the new system. In order to maintain accessibility, the data should be read via the old platform storage system, transferred to the new platform storage system, and encrypted by the new platform storage system. However, the process can be very time consuming when large capacity external storage systems are involved. This causes a long down time of the computer system which creates problems for businesses.

BRIEF SUMMARY OF THE INVENTION

In a first aspect, an object of the present invention is to provide a method and system to maintain accessibility of encrypted data in external storage systems without copying data from an old platform storage system to a new one. In order to accomplish this, encryption information including encryption key, key length, etc. is transferred from the old platform storage system to new platform storage system so that the new platform storage system can access encrypted data by using the transferred information. The old platform storage system exports mapping information between volume IDs and encryption information which includes algorithm, key length, and key. The new platform storage system imports encryption information and maps it to its volumes by referring to the volume IDs. Accordingly, the new platform storage system is able to access encrypted data on the external storage systems.

These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 2 illustrates an external volume table of the invention.

FIG. 3 illustrates an encryption table of the invention.

FIG. 4 illustrates a key table of the invention.

FIG. 9 illustrates how the key table is modified to contain encryption information in the second embodiment.

DETAILED DESCRIPTION OF THE INVENTION

Figure 1:
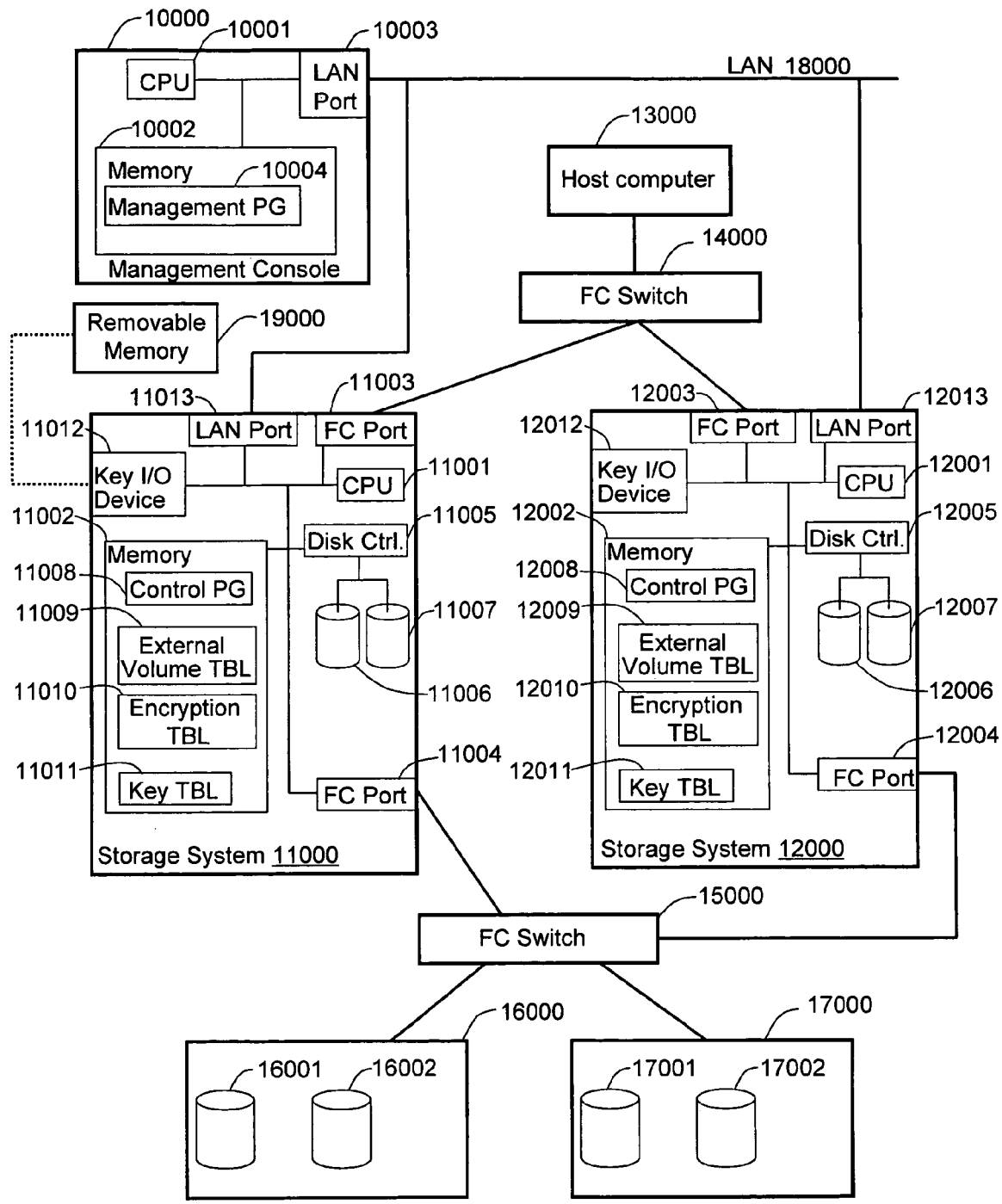
FIG. 1 illustrates a computer storage system in which the method and apparatus of this invention are applied.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views.

1st Embodiment

In the 1st embodiment, encryption information and volume IDs are exported to and transferred by a removable memory device such as USB memory, floppy disk, smart card, or the like.

FIG. 1 illustrates a computer storage system according to the first embodiment of the present invention. An existing first platform storage system 11000 is to be replaced or augmented by a second platform storage system 12000. Both platform storage system 11000 and platform storage system 12000 are connected to external storage systems 16000 and 17000 via an FC (Fibre Channel) switch 15000. First platform storage system 11000 has an encryption key for the data in external storage systems 16000, 17000, while second platform storage system 12000 does not. Platform storage systems 11000, 12000 are also connected to a host computer 13000 via an FC switch 14000 and FC ports 11003, 12003. Furthermore, they are connected to a LAN 18000 via LAN ports 11013, 12013. Platform storage systems 11000, 12000, include similar components capable of similar functions, with the similar components being indicated by reference numerals having similar final two digits. Accordingly, platform storage system 11000 will be described in detail.

In platform storage system 11000, CPU 11001 executes a control program 11008 stored in memory 11002. Control program 11008 controls the storage system and also processes I/O requests from the host computer 13000 and encrypts/decrypts data stored in external storage systems 16000 and 17000. The disk controller 11005 controls I/O from/to disk drives 11006 and 11007. FC port 11003 communicates with the FC port (not shown) in host computer 13000 via FC switch 14000. FC port 11004 communicates with FC ports (not shown) in external storage systems 16000, 17000 via FC switch 15000. Storage memory 11002 contains a control program 11008 and three tables, which are described below.

External volume table 11009 contains a WWN and a LUN as a volume ID for each external volume and has a structure shown in FIG. 2, for example. In FIG. 2, column 20001 contains the sequence number of the external volume. Column 20002 contains the unique WWN (World Wide Name) of the FC port in an external storage system which has the external volume. Column 20003 contains the LUN assigned to the external volume by an external storage system. Platform storage system 11000 can access an external storage system by sending I/O commands from FC port 11004, specifying WWN and LUN in the External volume table 11009. This table is defined in advance before the transfer procedure is started. For example, the table is defined when external volumes are discovered by a platform storage system. A volume ID is the combination of the WWN and the LUN in the external storage system, and is specified by the platform storage system in order to access the volume.

Encryption table 11010 contains encryption information for each external volume as shown in FIG. 3. Column 30001 contains the sequence number of the external volume. Column 30002 contains the encryption algorithm which is applied to the external volume. Columns 30003 and 30004 contain the key length and the key for encrypting the data, respectively. If an external volume is not encrypted, Column 30002 has "N/A" and columns 30003 and 30004 contain invalid values. This table is defined when an administrator configures encryption of external volumes.

Key table 11011 contains mapping between volume IDs and encryption information as shown in FIG. 4. Columns 40001 and 40002 contain values in the external volume table. Columns 40003, 40004, and 40005 contain values in the encryption table. This table is empty initially and generated when encryption information is to be transferred.

Referring back to FIG. 1, key I/O device 11012 is an interface for receiving a removable memory device 19000 such as a USB memory, floppy disk, or smart card, etc. The removable memory device 19000 stores encryption information that is to be transferred.

LAN port 11013 is connected to LAN 18000. Platform storage system 11000 communicates with other devices in the LAN via this port.

As stated above, the structure of platform storage system 12000 is similar to 11000. However, the encryption table 12010 of platform storage system 12000 is not defined initially. Rather, encryption table 12010 is defined after transferring encryption information from platform storage system 11000.

The management console 10000 is a computer which has a management program 10004, which is executed by CPU 10001, and a user interface (not shown). The management program 10004 is stored in a memory 10002. The management console 10000 is used to manage storage systems and sends and receives management information through LAN port 10003.

Figure 5A:
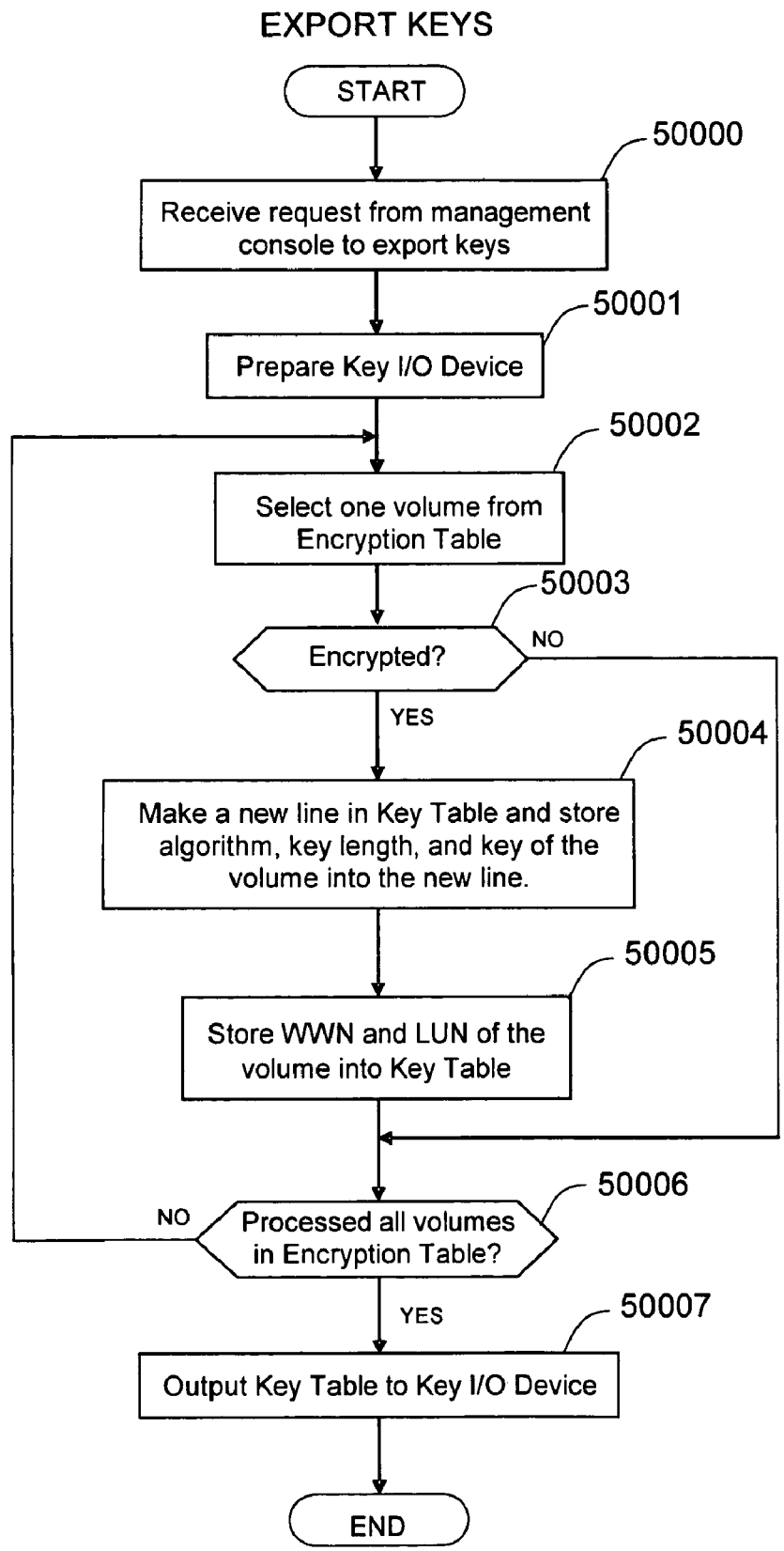
FIG. 5A illustrates the process flow of exporting keys executed by a control program in the existing storage system.

FIG. 5A illustrates the process flow executed by control program 11008 to export encryption information and volume IDs. At first, an administrator sends a request from the management console 10000 to platform storage system 11000 which has the encryption key(s). When the platform storage system receives the request (step 50000), it prepares the key I/O device 11012 so that the removable memory device 19000 is accessible (step 50001). Next, control program 11008 selects one volume from encryption table 11010 (step 50002). If column 30002 reads as "N/A", the volume is skipped because it is not encrypted. Otherwise, control program 11008 creates a new line in the key table 11011, reads the algorithm, key length, and key of the volume from encryption table 11010, and stores them into the new line created in the key table 11011 (step 50004). It also reads the WWN and the LUN of the volume from external volume table 11009 and stores them into key table 11011 (step 50005). Control program 11008 repeats steps 50002-50005 for all external volumes (step 50006). Finally, generated key table 11011 is outputted to the removable memory device 19000 via key I/O device 11012 (step 50007). The administrator transfers the removable memory device 19000 from platform storage system 11000 to platform storage system 12000.

Figure 5B:
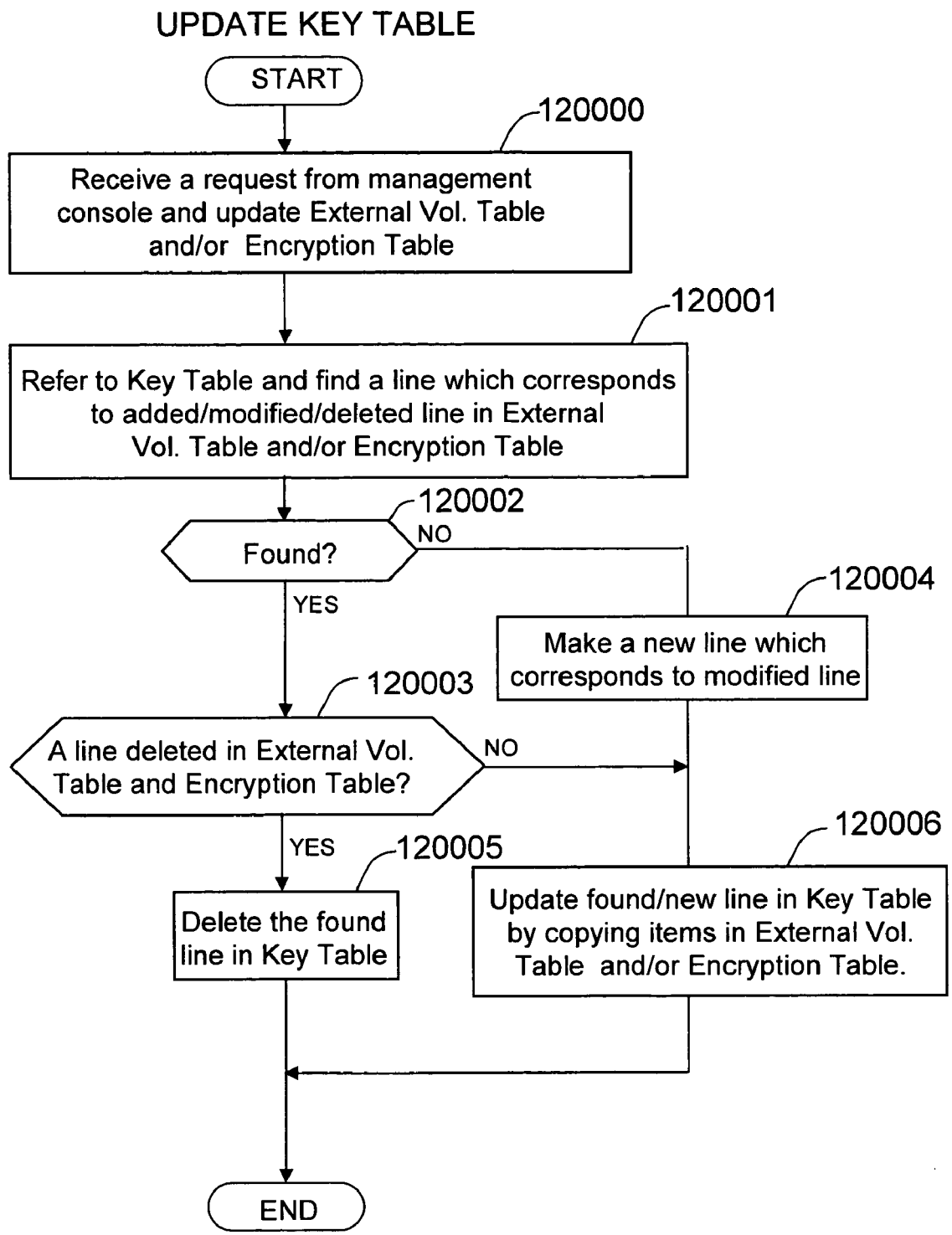
FIG. 5B illustrates the process flow of a updating the key table executed by a control program in the existing storage system.

FIG. 5B illustrates a process flow of an update operation in which the key table 11011 is updated so as to maintain the most recent data upon receiving a request from the management console (step 120000). Then a search is performed to find a line in the key table 11011 that corresponds to a line in the external volume table 11009 or the encryption table 11010 that has been added, modified, or deleted (steps 120001 and 120002). If a line is found in the key table 11011, it is determined if a line has been deleted in the external volume table 11009 and the encryption table 11010 (step 120003). If so, the line found in key table 11011 is deleted (step 12005). If it is determined that lines are not deleted in the external volume table 11009 and the encryption table 11010, then the found line in key table 11011 is updated by copying the necessary items from the external volume table 11009 and/or the encryption table 11010 (step 120006). Finally, if no corresponding line is found in the key table, a new line is formed (step 120004) and updated (step 120006).

Figure 5C:
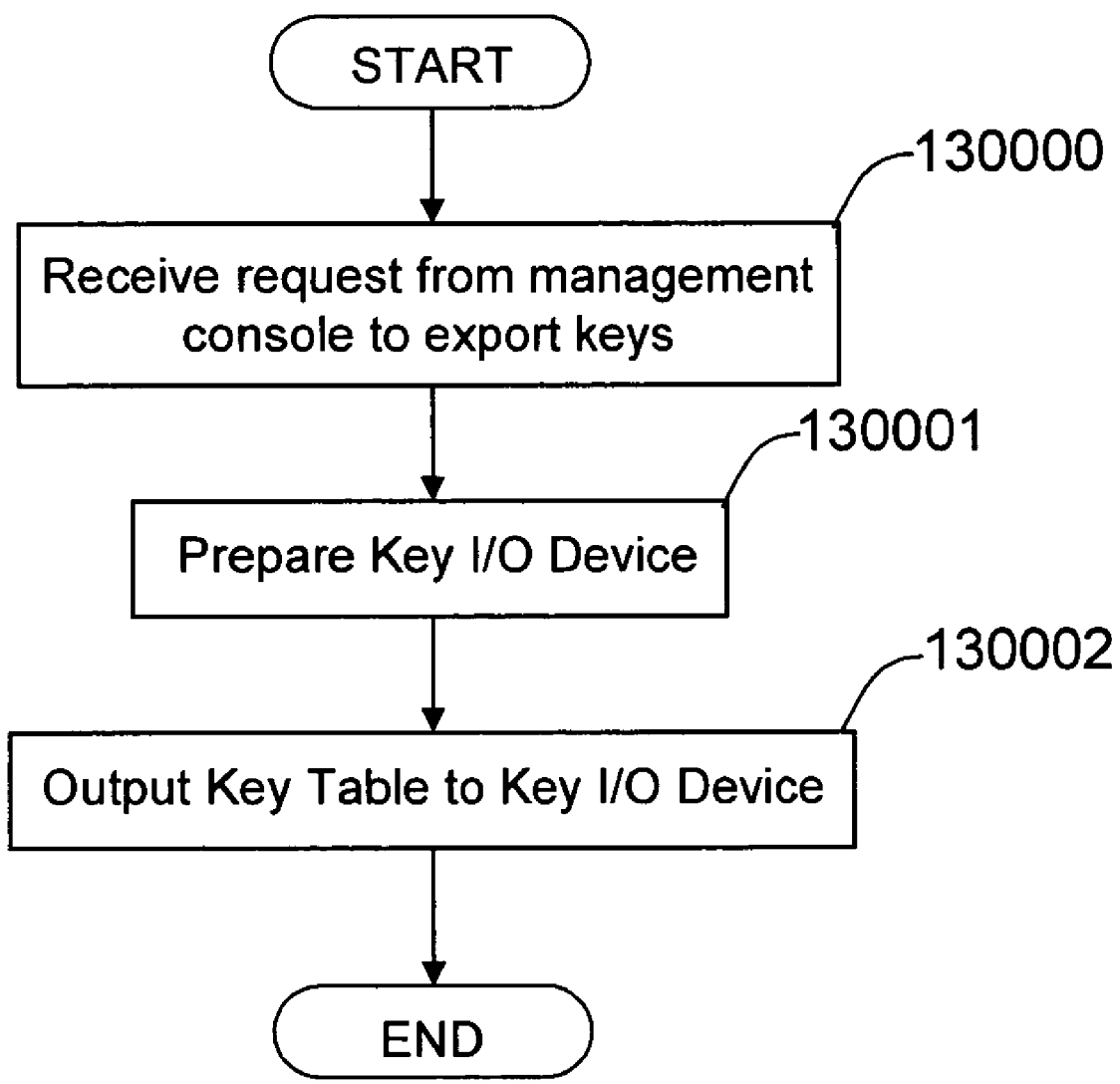
FIG. 5C illustrates the process flow of exporting keys after the key table is updated as executed by a control program in the existing storage system.

FIG. 5C illustrates a simplified version of exporting the key table 11011, since the key table 11011 has been updated as shown in FIG. 5B. Upon receipt of a request from the management console 10000 to export keys (step 130000), the key I/O device 11012 is prepared (step 130001) and the key table 11011 is output to the key I/O device 11012 and removable memory device 19000 (step 130002). Since the key table 11011 has been kept updated, it is always ready to be exported to a new platform storage system, which can save time.

Figure 6:
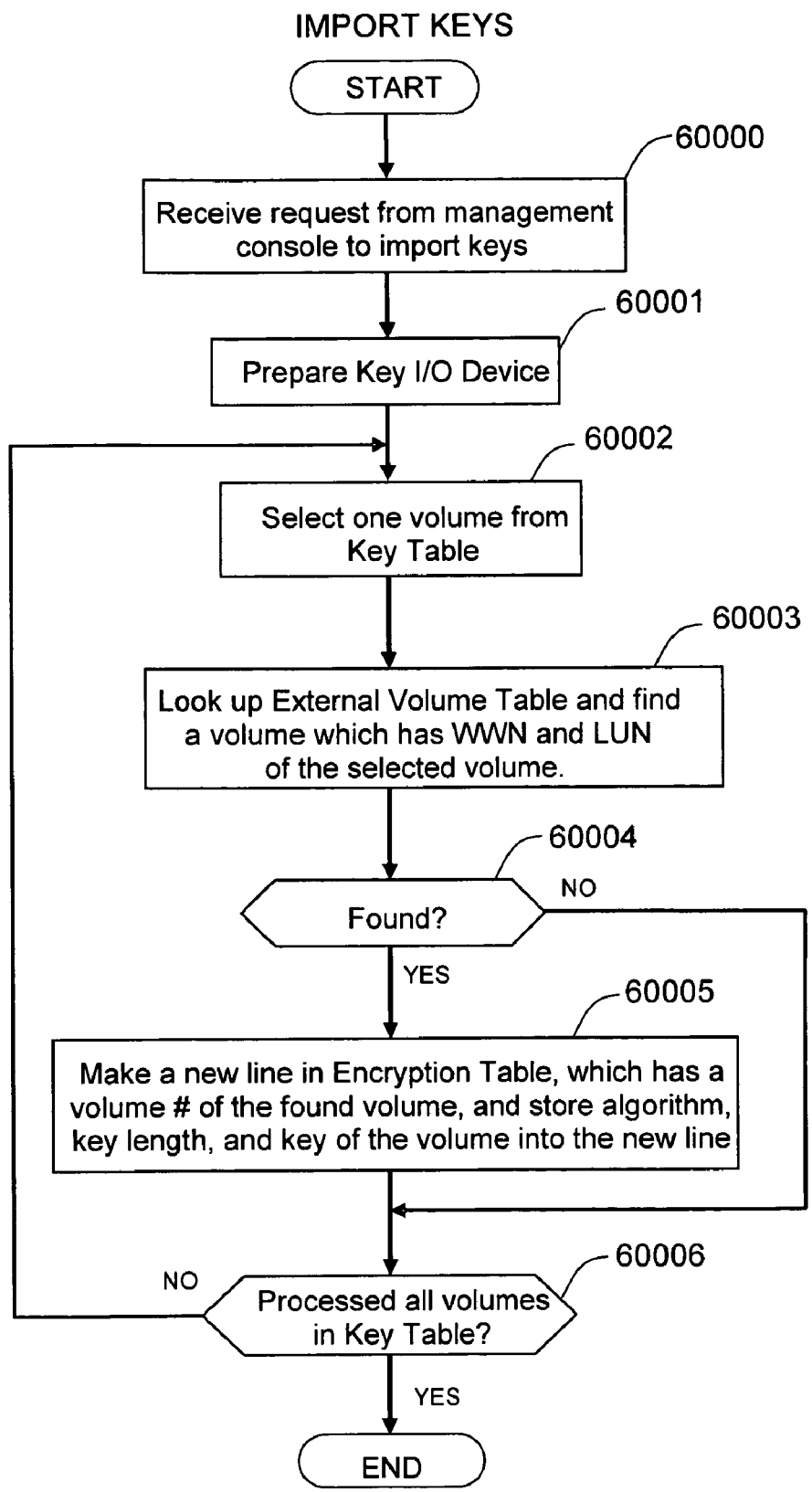
FIG. 6 illustrates the process flow of importing encryption information executed by a control program in a second platform storage system.

FIG. 6 illustrates the process flow executed by the control program 12008 in platform storage system 12000 to import encryption information and volume IDs. Steps 60000 and 60001 are similar to step 50000 and 50001 in FIG. 5A. Removable memory device 19000 is transferred to key I/O device 12012 of platform storage system 12000, and key table 11011 contained in removable memory device 19000 is read by control program 12008. The control program of platform storage system 12000 selects one volume from key table 11011 (step 60002). It looks in the external volume table 12009 of platform storage system 12000 and finds a volume which has WWN and LUN of the selected volume (step 60003). If no volume is found, the selected volume is skipped because it was not discovered by the platform storage system 12000 (step 60004). If the volume is found, it creates a new line in an encryption table 12010 for the selected volume. The encryption table 12010 is a combination of the external volume table 12009 and the key table 11011. The control program 12008 reads the volume number of the found volume from the external volume table 12009 and stores it into the new line created in encryption table 12010. It also reads the encryption information from key table 11011 in the removal memory device 19000 and stores such information into the encryption table 12010 (step 60005). Steps 60002-60006 are repeated for all lines in key table 11011 in the removable memory device 19000 (step 60006).

As a result of the import/export of encryption information as described above, platform storage system 12000 can access encrypted data in external volumes without copying the data. In this embodiment, encryption information is stored into removable memory device 19000 in clear text. However, it is possible to encrypt this information to prevent unauthorized access to the information. It is also possible to send and receive requests from the user interface which is attached to each platform storage system instead of through network connected management console 10000. Also, the information in key table 11011 can be directly copied to the memory in platform storage system 12000 and processed from there instead of using the removable memory device 19000. Apart from this variation the processing is substantially the same.

2nd Embodiment

According to a second embodiment, a volume ID is unique information which is obtained in the response to SCSI inquiry command. The encryption algorithm and key are defined for blocks in a volume, which is specified by a start LBA (Logical Block Address) and last LBA. The differences between this embodiment and the first embodiment are described below.

Figure 7:
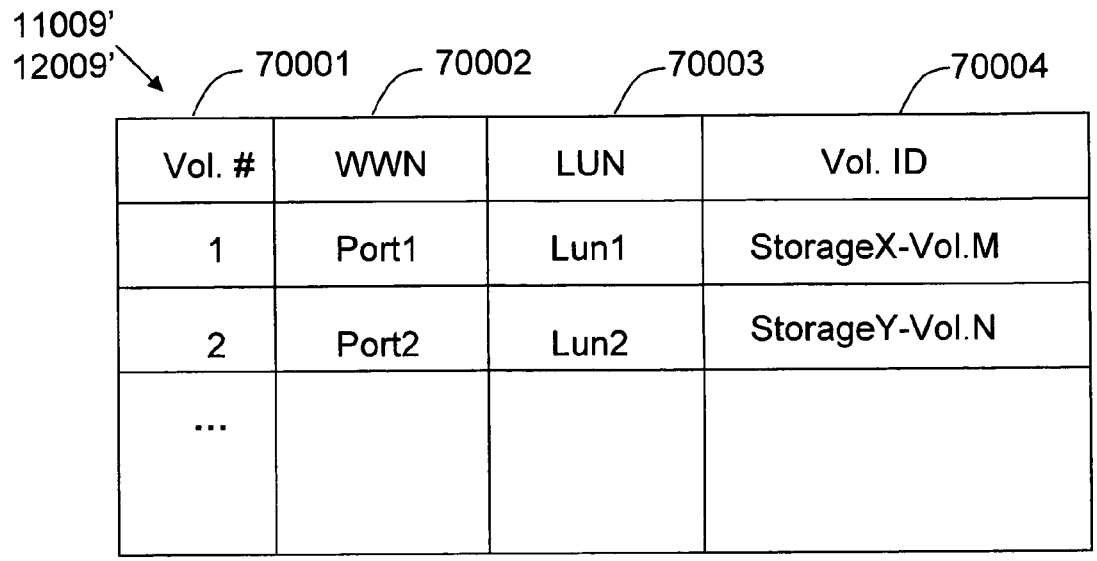
FIG. 7 illustrates an external volume table of a second embodiment of the invention.
Figure 8:
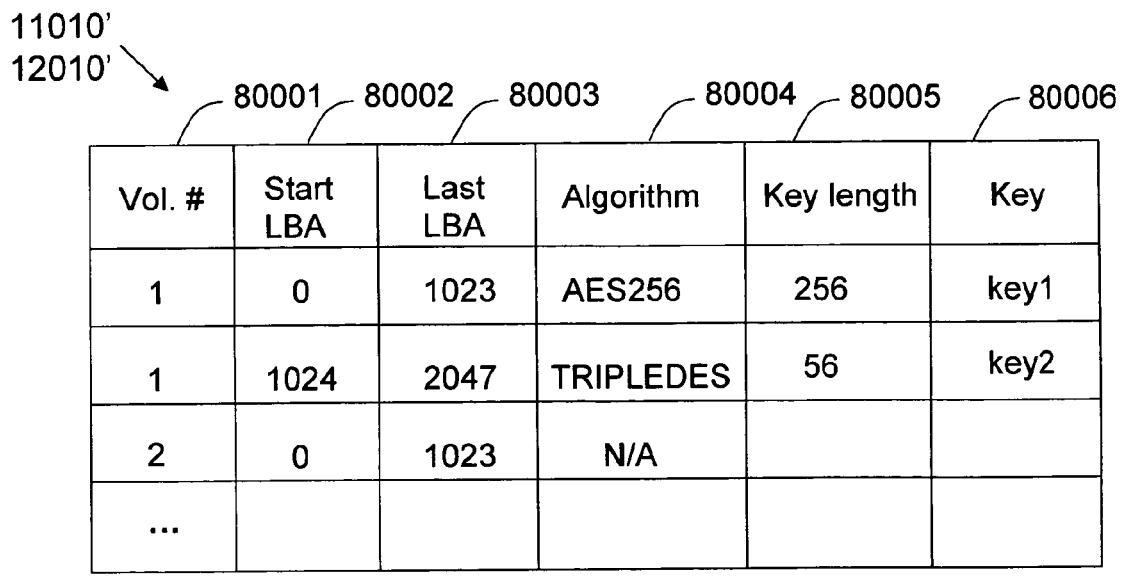
FIG. 8 illustrates how encryption information is defined for blocks in a volume in an encryption table of the second embodiment.

Encryption information and volume IDs are transferred via a network, instead of by a removable memory device. Therefore, the key I/O devices 11012, 12012 are unnecessary and are not used. External volume table 11009' of the second embodiment has a structure shown in FIG. 7. The volume ID is unique information which is obtained in the response to the SCSI inquiry command, such as a volume ID which contains the serial number of a storage system which provides the volume and serial number of the volume. Encryption information is defined for blocks in a volume in encryption table 11010' as shown in FIG. 8. Columns 80002 and 80003 contain the start LBA and last LBA of the encrypted blocks, respectively. Key table 11011' is also modified to contain encryption information for blocks in a volume as shown in FIG. 9.

Figure 10:
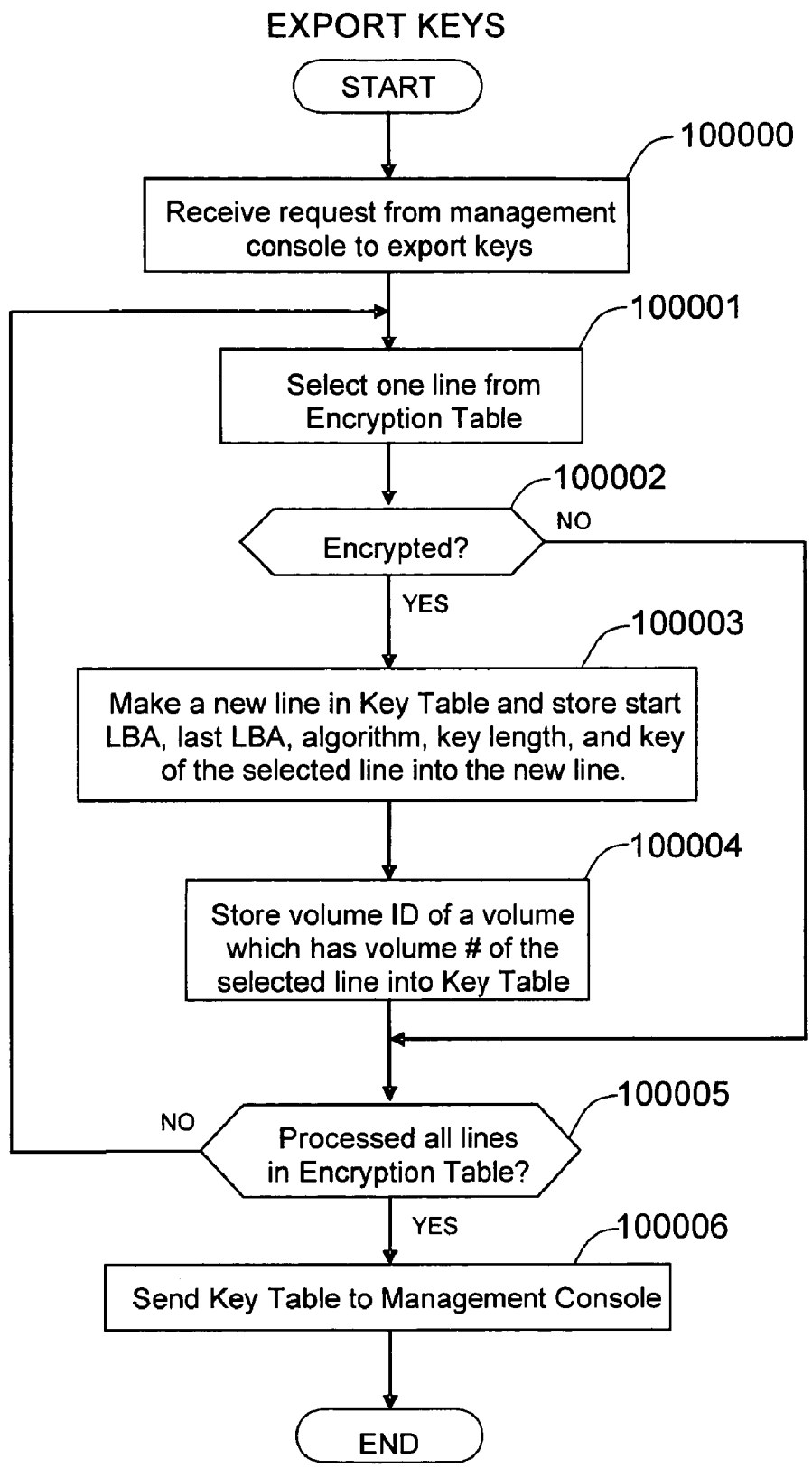
FIG. 10 illustrates the process flow executed by the control program in the existing platform storage system in the second embodiment.

FIG. 10 illustrates the process flow executed by control program 11008 to export encryption information and volume IDs. The differences from FIG. 5A in the first embodiment are as follows. The steps related to key I/O device are omitted because they do not apply in this embodiment. In step 100003, control program copies the start LBA and the last LBA from the encryption table 11010' to the key table 11011' because encryption information is defined for blocks in a volume in encryption table 11010'. In step 100004, a unique volume ID is stored instead of the combination of WWN and LUN. The control program 11008 sends the generated key table 11011' to the management console 10000 so that it may be transferred to platform storage system 12000 via a network 18000 (step 100006).

Figure 11:
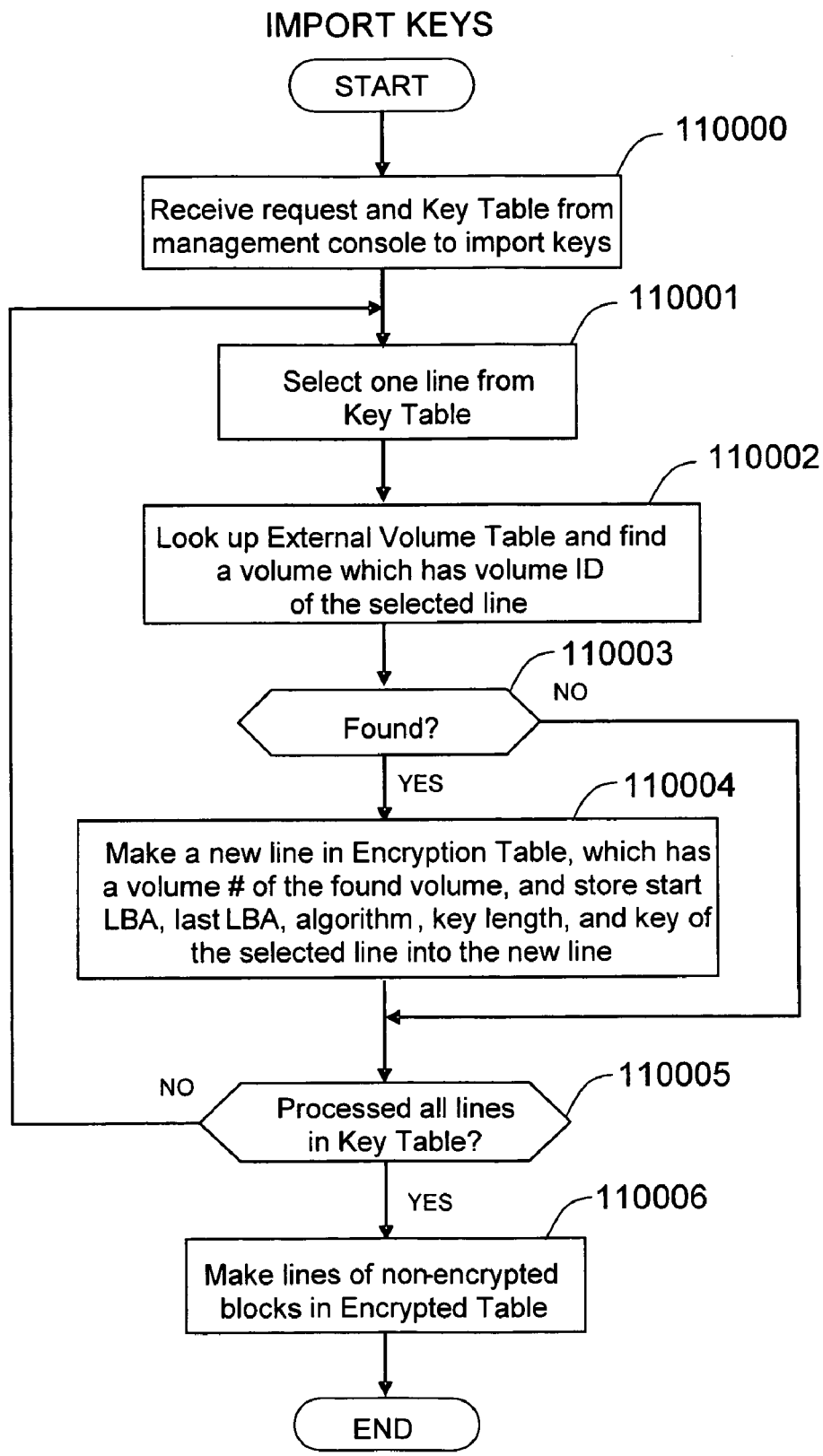
FIG. 11 illustrates the process flow executed by the control program in a second platform storage system in the second embodiment.

FIG. 11 illustrates the process flow executed by control program in platform storage system 12000 to import encryption information and volume IDs. The difference from FIG. 6 in the first embodiment is as follows. Management program 10004 in management console 10000 sends key table 11011', which is exported from platform storage system 11000 (step 110000). The steps related to key I/O device 12012 are omitted because they don't apply in this embodiment. In step 110002, a unique volume ID is referred to instead of the combination of WWN and LUN. In step 110004, the control program 12008 copies the start LBA and the last LBA from key table 11011' to the encryption table 12010' of platform storage system 12000 because encryption information is defined for blocks in a volume in encryption table 12010'. In step 110006, the control program 12008 creates lines for non-encrypted blocks in encryption table 12010'.

In this embodiment, a unique volume ID is used so that the mapping between external volumes and encryption information can be maintained even if the port and LUNs in the external storage systems are modified. Encryption can be configured flexibly for each area specified by blocks, instead of each volume. Once again, the removal memory device is not necessary because the information is transferred via a network.

There are several variants which are not specifically described in the embodiments. By restricting invoking of the import and export procedure to authorized users, the system becomes more secure. If plural keys are used to encrypt a volume or blocks, the table structures and procedures can be extended to handle them. The key table is represented in a XML format which is proposed in IEEE p1619. In the embodiments described above, platform storage systems and external storage systems are connected by FC network. However, it is possible to connect them by an IP network and use IP Addresses or iSCSI names instead of WWN or response of Inquiry command.

Furthermore, while encryption has been emphasized as the security information that is transferred to the new platform storage system, other types of security information may also be transferred, such as, but not limited to LDEV Guard and other data management information including data mirroring information. LDEV Guard is a data retention manager of Hitachi Data Systems that uses a WORM (Write Once Read Many) function that permits certain data to only be retrieved and read by authorized applications, but not altered or deleted, for a mandatory retention period.

While specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

The invention claimed is:

1. A method for enabling access by a second platform storage system to encrypted data encrypted by a first platform storage system and stored in an external storage system when the second platform storage system is to replace the first platform storage system, the first platform storage system initially being in communication with a host computer for receiving input/output (I/O) requests from the host computer, the method comprising the steps of:

receiving by said first platform storage system write data from the host computer;

encrypting the write data by the first platform storage system and storing the encrypted write data as at least part of the encrypted data in the external storage system;

storing encryption information in said first platform storage system that corresponds to the encrypted data stored in the external storage system;

transferring said encryption information from said first platform storage system to said second platform storage system;

connecting the second platform storage system for communication with said host computer and said external storage system; and storing said encryption information in said second platform storage system to enable said second platform storage system, in response to a request received from the host computer, to access the encrypted data contained in said external storage system, decrypt the encrypted data, and return unencrypted data to said host computer.

2. The method according to claim 1, wherein said step of transferring said encryption information includes the steps of storing said encryption information into a removable memory device at said first platform storage system, removing said removable memory device from said first platform storage system, and transferring said encryption information from the removable memory device to said second platform storage system.

3. The method according to claim 1, wherein said step of transferring said encryption information includes the steps of preparing a key table in the first platform storage system by identifying which external volumes of said external storage system are encrypted, and mapping a World Wide Name (WWN) and logical unit number (LUN) of each identified external volume to the encryption information for that volume;

transferring the key table to said second platform storage system;

matching the WWN and LUN of each external volume in the key table to a volume ID in the second platform storage system; and mapping corresponding encryption information to each matched volume ID.

4. The method according to claim 3, further comprising the step of maintaining an updated key table in said first platform storage system containing updated encryption information so that the step of transferring the encryption information can be immediately performed by referring to said updated key table.

5. The method according to claim 4, wherein the key table is updated each time there is any change in the encrypted data stored in said external storage system.

6. The method according to claim 1, wherein said step of transferring said encryption information includes transferring the encryption information via a network connection between said first platform storage system and said second platform storage system.

7. The method according to claim 6, wherein SCSI Inquiry commands are used over the network in order to locate volume IDs of volumes located in said external storage system.

8. The method according to claim 1, wherein the encryption information is stored on a volume by volume basis.

9. The method according to claim 1, wherein the encryption information is stored on a logical block by logical block basis as calculated by respective start and last logical block addresses (LBAs).

10. The method according to claim 1, wherein said first platform storage system includes a memory storing a program used to transfer said encryption information, said memory also comprising an external volume table containing WWN and LUN information of volumes contained in said external storage system.

11. The method according to claim 10, wherein said memory further comprises an encryption table containing encryption information for encrypted volumes of said external storage system.

12. The method according to claim 11, wherein said memory further comprises a key table combining the WWN and LUN information of the volumes as stored in the external volume table with the encryption information stored in the encryption table.

13. The method according to claim 12, wherein the encryption information includes encryption algorithm, key and key length.

14. The method according to claim 1, wherein said first platform storage system includes a memory storing a program used to transfer said encryption information, said memory also comprising an external volume table containing WWN and LUN information of logical blocks of volumes contained in said external storage system.

15. The method according to claim 14, wherein said memory further comprises an encryption table containing encryption information for encrypted logical blocks of volumes of said external storage system.

16. The method according to claim 15, wherein said memory further comprises a key table combining the WWN and LUN information of the logical blocks of volumes as stored in the external volume table with the encryption information stored in the encryption table.

17. The method according to claim 16, wherein the encryption information includes encryption algorithm, key and key length.

18. A system comprising:
a first platform storage system;
a second platform storage system;
a host computer initially in communication with at least said first platform storage system, wherein said host computer stores data to said first platform storage system, said data being encrypted by said first platform storage system as encrypted data; and
an external storage system in communication with said first platform storage system, wherein said first platform storage system stores the encrypted data to said external storage system,
wherein encryption information stored in a memory in said first platform storage system corresponds to the encrypted data in said external storage system;
wherein said platform storage system is connected for communication with said external storage system and said host computer, said second platform storage system including an encryption table stored in said second platform storage system;
wherein said encryption information stored in said memory of said first platform storage system is transferred to said encryption table stored in said second platform storage system so that said second platform storage system, in response to a request received from said host computer, can read the encrypted data stored in said external storage system by said first platform storage system, and decrypt the encrypted data in order to return unencrypted data to said host computer.

19. The system according to claim 18, further comprising a removable I/O device for storing said encryption information so that it can be transferred from said first platform storage system to said second platform storage system.

20. The system according to claim 18, wherein said memory in said first platform storage system stores a key table prepared by identifying which external volumes of said external storage system are encrypted, and mapping a World Wide Name (WWN) and logical unit number (LUN) of each identified external volume to the encryption information for that volume, wherein the second platform storage system uses said key table to match the WWN and LUN of each external volume in the key table to a volume ID in the second platform storage system, and map corresponding encryption information to each matched volume ID.

21. The system according to claim 20, further comprising an updated key table stored in said memory and containing updated encryption information so that the encryption information can be quickly transferred to said second platform storage system by referring to said updated key table.

22. The system according to claim 18, further comprising a network over which the encryption information is transferred.

23. The method according to claim 22, wherein SCSI Inquiry commands are used over the connection in order to locate volume IDs of volumes located in said external storage system.

24. The system according to claim 18, wherein the encryption information is stored on a volume by volume basis.

25. The system according to claim 18, wherein the encryption information is stored on a logical block by logical block basis as calculated by respective start and last logical block addresses (LBAs).

26. The system according to claim 18, wherein said first platform storage system includes a memory storing a program used to transfer said encryption information, said memory also comprising an external volume table containing WWN and LUN information of volumes contained in said external storage system.

27. The system according to claim 26, wherein said memory further comprises an encryption table containing encryption information for encrypted external volumes of said external storage system.

28. The system according to claim 27, wherein said memory further comprises a key table combining the WWN and LUN information of the volumes as stored in the external volume table with the encryption information stored in the encryption table.

29. The system according to claim 28, wherein the encryption information includes encryption algorithm, key and key length.

30. The system according to claim 18, wherein said first platform storage system includes a memory storing a program used to transfer said encryption information, said memory also comprising an external volume table containing WWN and LUN information of logical blocks of volumes contained in said external storage system.

31. The system according to claim 30, wherein said memory further comprises an encryption table containing encryption information for encrypted logical blocks of volumes of said external storage system.

32. The system according to claim 31, wherein said memory further comprises a key table combining the WWN and LUN information of the logical blocks of volumes as stored in the external volume table with the encryption information stored in the encryption table.

33. The system according to claim 32, wherein the encryption information includes encryption algorithm, key and key length.

34. A computer readable storage medium storing thereon a program controlling to perform the steps of:
creating a key table in a first platform storage system, said key table containing encryption information corresponding to encrypted data stored in an external storage system, said encrypted data being stored in an external volume in said external storage system by the first platform storage system, wherein said first platform storage system receives data from a host computer, encrypts the data to create the encrypted data, and stores the encrypted data in the external volume, said key table being created by identifying which external volumes of said external storage system are encrypted, and mapping a World Wide Name (WWN) and logical unit number (LUN) of each external volume to the encryption information for that volume;
transmitting said key table to a second platform storage system when the second platform storage system is connected to said external storage system to replace said first platform storage system; and
creating an encryption table in said second platform storage system using said key table to match the WWN and LUN of each external volume in the key table to a volume ID in the second platform storage system, and mapping corresponding encryption information to each matched volume ID.

35. The medium according to claim 34, wherein the step of creating a key table includes the steps of reading information from an external volume table and an encryption table.

36. The medium according to claim 34, wherein the program further controls to perform the step of transferring the key table to a removable I/O device in said first platform storage system.

37. A method for enabling access by a second platform storage system to secured data secured by a first platform storage system and stored in an external storage system when the second platform storage system replaces the first platform storage system, the method comprising the steps of:

receiving write data at said first storage system from a host computer, said first storage system storing and securing the write data in the external storage system as the secured data;

storing security information in said first platform storage system that corresponds to the secured data stored in the external storage system;

transferring said security information from said first platform storage system to said second platform storage system such that said second platform storage system can use the security information to access the secured data in the external storage system in response to a request received at the second platform storage system from the host computer; and connecting the second platform storage system for communication with the external storage system and the host computer, whereby the second platform storage system replaces the first platform storage system.

38. The method according to claim 37 wherein said security information includes management information that permits certain data to only be retrieved and read by authorized applications, but not altered or deleted, for a mandatory retention period.

39. The method according to claim 37, wherein said security information includes encryption information.

40. The method according to claim 37, wherein said security information includes data mirroring information.

\* \* \* \* \*